United States Patent
Gibbs et al.

(10) Patent No.: US 12,502,971 B2
(45) Date of Patent: Dec. 23, 2025

(54) RECHARGEABLE ENERGY STORAGE SYSTEM LIQUID INTRUSION DETECTION AND SEVERITY DETERMINATION FOR HIGH VOLTAGE OPERATION

(71) Applicant: GM Global Technology Operations LLC, Detroit, MI (US)

(72) Inventors: James C. Gibbs, Brighton, MI (US); Bin Li, Troy, MI (US); James Routh, Oak Ridge, TN (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 168 days.

(21) Appl. No.: 18/495,123

(22) Filed: Oct. 26, 2023

(65) Prior Publication Data

US 2025/0135896 A1    May 1, 2025

(51) Int. Cl.
*B60L 3/00*    (2019.01)
*G01M 3/18*    (2006.01)
*H01M 10/42*    (2006.01)
*H01M 10/613*    (2014.01)
*H01M 10/625*    (2014.01)
*H01M 10/633*    (2014.01)

(52) U.S. Cl.
CPC ........... *B60L 3/0069* (2013.01); *B60L 3/0038* (2013.01); *B60L 3/0046* (2013.01); *G01M 3/186* (2013.01); *H01M 10/425* (2013.01); *H01M 10/613* (2015.04); *H01M 10/625* (2015.04); *H01M 10/633* (2015.04); *H01M 2010/4278* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2022/0328893 A1* | 10/2022 | Oenick | B63H 21/17 |
| 2023/0037313 A1* | 2/2023 | Hu | B60L 3/0053 |
| 2023/0278462 A1* | 9/2023 | Bays | B60L 58/14 320/127 |

* cited by examiner

*Primary Examiner* — Jelani A Smith
*Assistant Examiner* — Davin Seol
(74) *Attorney, Agent, or Firm* — CANTOR COLBURN LLP

(57) ABSTRACT

A vehicle includes a system performing a method of operating the vehicle. The system includes a battery pack, a sensor associated with the battery pack, a cooling system for cooling the battery pack, and a processor. The processor is configured to measure a battery pack parameter of the battery pack for an occurrence of a battery pack fault, measure a sensor parameter for the occurrence of a sensor fault in the sensor, measure a cooling system parameter of the cooling system for the occurrence of a cooling system fault, determine an ingress of a fluid into the battery pack based on the occurrence of the battery pack fault and one of the sensor fault and the cooling system fault, and perform an action based on the ingress of the fluid into the battery pack.

20 Claims, 3 Drawing Sheets

RECHARGEABLE ENERGY STORAGE SYSTEM LIQUID INTRUSION DETECTION AND SEVERITY DETERMINATION FOR HIGH VOLTAGE OPERATION

INTRODUCTION

The subject disclosure relates to operation of a battery pack used in a vehicle and, in particular, to a system and method for determining a presence of a fluid in the battery pack and taking mitigating steps based on the presence of fluid.

An electric vehicle is powered by a rechargeable energy storage system (RESS), also known as a battery pack. A battery pack is intended to be sealed from its outside environment to prevent inflow of fluid that may cause the battery pack to short out or otherwise malfunction. A battery pack can include a moisture sensing device that can be used to detect fluid. However, such a sensor adds weight to the vehicle. Accordingly, it is desirable to provide a system and method for determining an inflow of a fluid into a battery pack by observing the effect of the fluid on existing hardware.

SUMMARY

In one exemplary embodiment, a method of operating a vehicle is disclosed. A battery pack parameter of a battery pack of the vehicle is measured for an occurrence of a battery pack fault. A sensor parameter is measured for the occurrence of a sensor fault in a sensor associated with the battery pack. A cooling system parameter is measured of a cooling system associated with to the battery pack for the occurrence of a cooling system fault. An ingress of a fluid into the battery pack is determined based on the occurrence of the battery pack fault and one of the sensor fault and the cooling system fault. An action is performed based on the ingress of the fluid into the battery pack.

In addition to one or more of the features described herein, the battery pack fault includes a drop in an isolation resistance in a path between the battery pack and a ground potential below an electrical fault threshold.

In addition to one or more of the features described herein, the sensor fault is related to at least one of operation of the sensor, operation of a communication device of the battery pack, and operation of a microprocessor of the battery pack.

In addition to one or more of the features described herein, the method further includes determining the battery pack fault to be one of a low isolation resistance and a high isolation resistance.

In addition to one or more of the features described herein, the battery pack fault includes the low isolation resistance, the method further including determining the fluid to be a coolant.

In addition to one or more of the features described herein, the battery pack fault includes the high isolation resistance, the method further including determining the fluid to be a water when the sensor fault occurs.

In addition to one or more of the features described herein, the battery pack fault includes the high isolation resistance, the method further including determining the fluid to be a coolant when the cooling system fault occurs.

In another exemplary embodiment, a system for operating a vehicle is disclosed. The system includes a battery pack, a sensor associated with the battery pack, a cooling system for cooling the battery pack, and a processor. The processor is configured to measure a battery pack parameter of the battery pack for an occurrence of a battery pack fault, measure a sensor parameter for the occurrence of a sensor fault in the sensor, measure a cooling system parameter of the cooling system for the occurrence of a cooling system fault, determine an ingress of a fluid into the battery pack based on the occurrence of the battery pack fault and one of the sensor fault and the cooling system fault, and perform an action based on the ingress of the fluid into the battery pack.

In addition to one or more of the features described herein, the battery pack fault includes a drop in an isolation resistance in a path between the battery pack and a ground potential below an electrical fault threshold.

In addition to one or more of the features described herein, the sensor fault is related to at least one of operation of the sensor, operation of a communication device of the battery pack, and operation of a microprocessor of the battery pack.

In addition to one or more of the features described herein, the processor is further configured to determine the battery pack fault to be one of a low isolation resistance and a high isolation resistance.

In addition to one or more of the features described herein, the processor is further configured to determine the fluid to be a coolant based on the battery pack fault including the low isolation resistance.

In addition to one or more of the features described herein, the processor is further configured to determine the fluid to be a water based on the battery pack fault including the high isolation resistance and the occurrence of the sensor fault.

In addition to one or more of the features described herein, the battery pack fault includes the high isolation resistance, and the processor is further configured to determine the fluid to be coolant based on the battery pack fault including the high isolation resistance and the occurrence of the cooling system fault.

In yet another exemplary embodiment, a vehicle is disclosed. The vehicle includes a battery pack, a sensor associated with the battery pack, a cooling system for cooling the battery pack, and a processor. The processor is configured to measure a battery pack parameter of the battery pack for an occurrence of a battery pack fault, measure a sensor parameter for the occurrence of a sensor fault in the sensor, measure a cooling system parameter of the cooling system for the occurrence of a cooling system fault, determine an ingress of a fluid into the battery pack based on the occurrence of the battery pack fault and one of the sensor fault and the cooling system fault, and perform an action based on the ingress of the fluid into the battery pack.

In addition to one or more of the features described herein, the battery pack fault includes a drop in an isolation resistance in a path between the battery pack and a ground potential below an electrical fault threshold.

In addition to one or more of the features described herein, the sensor fault is related to at least one of operation of the sensor, operation of a communication device of the battery pack, and operation of a microprocessor of the battery pack.

In addition to one or more of the features described herein, the processor is further configured to determine the battery pack fault to be one of a low isolation resistance and a high isolation resistance.

In addition to one or more of the features described herein, the processor is further configured to determine the fluid to be a coolant based on the battery pack fault including the low isolation resistance.

In addition to one or more of the features described herein, the processor is further configured to determine the fluid to be one of a water based on the battery pack fault including the high isolation resistance and the occurrence of the sensor fault and a coolant based on the battery pack fault including the high isolation resistance and the occurrence of the cooling system fault.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
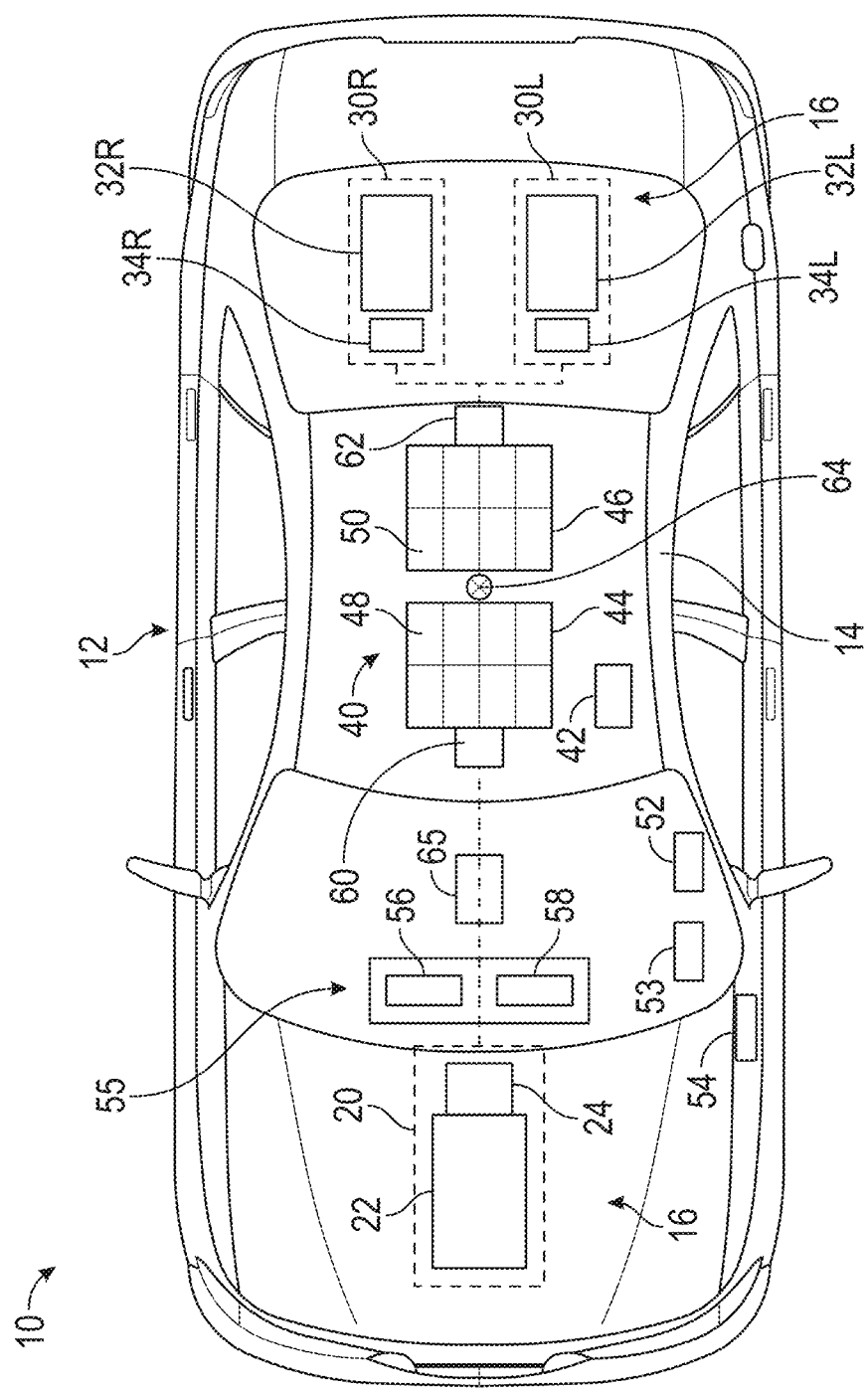
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22, the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery.

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In an alternative embodiment, the vehicle 10 can be an internal combustion engine vehicle, a hybrid vehicle, etc.

Figure 2:
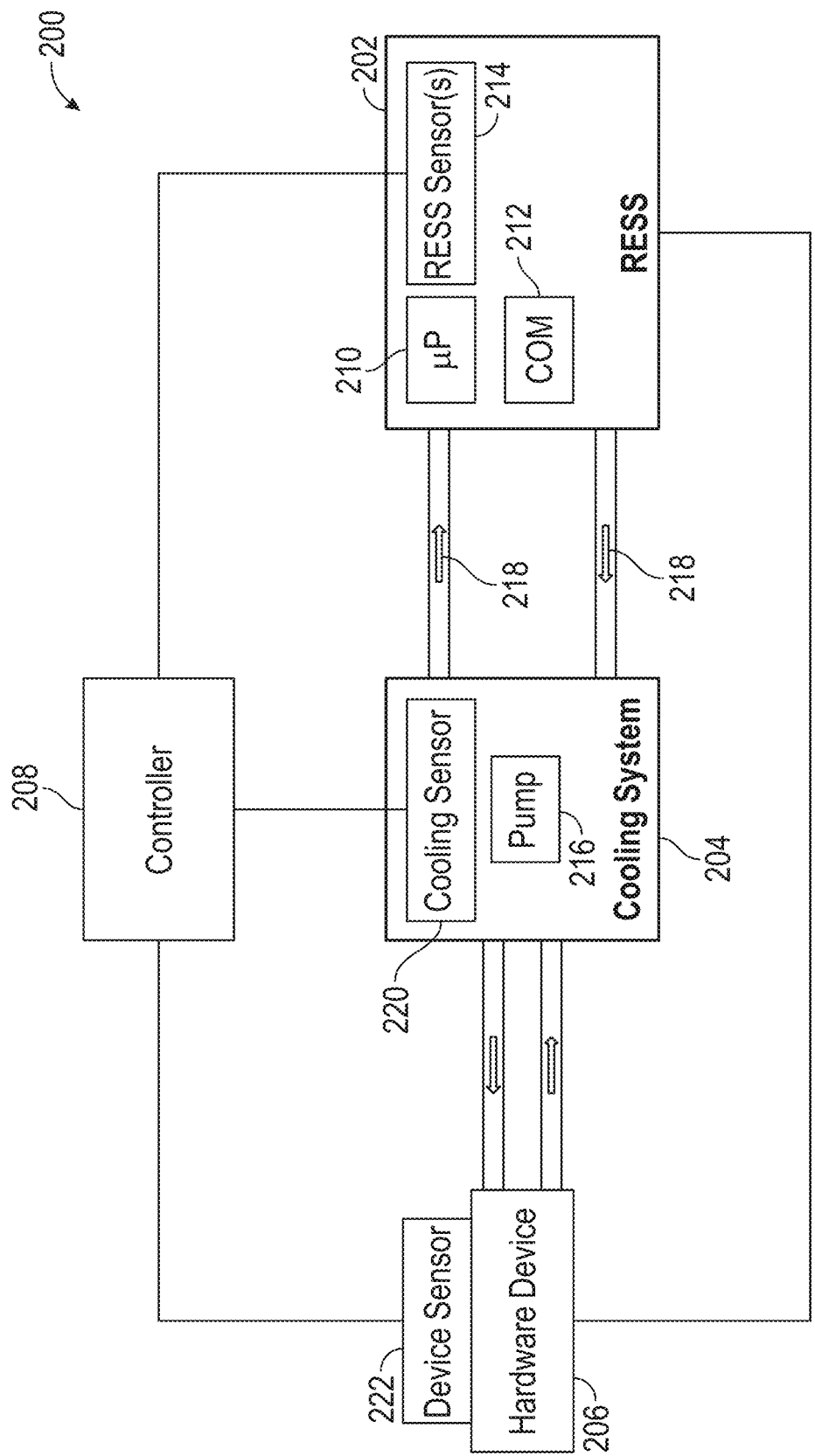
FIG. 2 shows an electrical system of the vehicle, in an illustrative embodiment.

FIG. 2 shows an electrical system 200 of the vehicle, in an illustrative embodiment. The electrical system 200 includes a battery pack 202 (e.g., a Rechargeable Energy Storage System (RESS)) of the vehicle, a cooling system 204 for the battery pack, one or more hardware devices 206 that are powered by the battery pack 202, and a controller 208 that controls various operations of the electrical system. The battery pack 202 includes a microprocessor 210 and a communication device 212. The microprocessor 210 controls operation of the battery pack 202, including controlling voltage levels of the cells of the battery pack, etc. The communication device 212 communicates data between the battery pack 202 and the controller 208 or a remote location. The battery pack 202 also includes a plurality of battery pack sensors 214 for measuring various parameters of the battery pack, operating parameters of the microprocessor 210 and/or operating parameters of the communication device. Operation of the sensors themselves can also be monitored. Parameters of the battery pack 202 include, but are not limited to, individual cell voltages, a resistance between the battery pack and a ground potential, and a temperature of the battery pack. Operating parameters of the microprocessor 210 include, but are not limited to, cell voltage monitoring parameters and pump monitoring parameters. Operating parameters of the communication device 212 include, but are not limited to, such as signal loss, signal delay, and quality of the data.

The cooling system 204 is used to cool the battery pack 202. The cooling system 204 includes a pump 216 which circulates a coolant 218 into and out of the battery pack 202 in order to cool the battery pack or elements of the battery pack. A cooling system sensor 220 measures various operating parameters of the cooling system. Exemplary operating parameters include a pump speed, a coolant temperature, coolant volume, etc.

The battery pack 202 powers the one or more hardware devices 206. A device sensor 222 measures various operating parameters of the one or more hardware devices 206, which can include a voltage across the device, a temperature of the device, etc.

The battery pack sensors 214, cooling system sensor 220, and device sensor 222 provide their measurements to the controller 208. The controller 208 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 208 may include a non-transitory computer-readable medium that stores instructions which, when processed by one or more processors of the controller 208, implement a method of determining an ingress of a fluid or moisture into the battery pack, including distinguishing between water and coolant ingress, and performing a mitigation method based on the ingress, according to one or more embodiments detailed herein.

From the measured parameters, the controller 208 can determine the presence one or more faults. A fault generally lies within one of three categories: a battery pack fault, a sensor fault and a cooling system fault. A battery pack fault can include an isolation fault or a drop in a resistance in an electrical path between the battery pack 202 and a ground potential. The isolation fault occurs when this resistance drops below an electrical fault threshold. For a battery pack 202 having a nominal isolation resistance in a range of 6 Mega-ohms (MΩ), an isolation fault can bet determined when the isolation resistance is 500 kΩ, for example. The controller 208 can further determine whether the isolation fault is a minor isolation fault or a major isolation fault by comparing the isolation resistance to a fault severity threshold. A minor isolation fault will have a resistance greater than the fault severity threshold, while a major isolation fault will have a resistance less than the fault severity threshold.

The controller 208 can further determine a sensor fault, such as an erratic sensor or a sensor operating out of limits. For example, an erratic temperature sensor produces temperature measurements that vary at a rate greater than a selected threshold value, such as half a degree per second. A sensor value fault occurs when voltage indicative of the measured value (e.g., temperature) goes outside of a sensor range (i.e., greater than a maximum value or less than a minimum value). The controller 208 can further determine the presence of a fault in the communication system, such as a signal loss or signal delay. The controller 208 can determine a cooling system fault from cooling system parameters. Examples of a cooling system fault can include a low pump speed, a low coolant volume in a coolant line, an elevated coolant temperature, etc.

An occurrence of a fault in any two of the categories (i.e., battery pack fault, sensor fault, cooling system fault) can be used to identify fluid ingress into the battery pack 202. For example, an isolation fault (battery pack fault) and a low coolant volume (cooling system fault) can indicate that coolant has entered the battery pack. In another example, an isolation fault (battery pack fault) and an erratic sensor voltage (sensor fault) can indicate either water or coolant has entered the battery pack (depending on the severity of the isolation fault).

Figure 3:
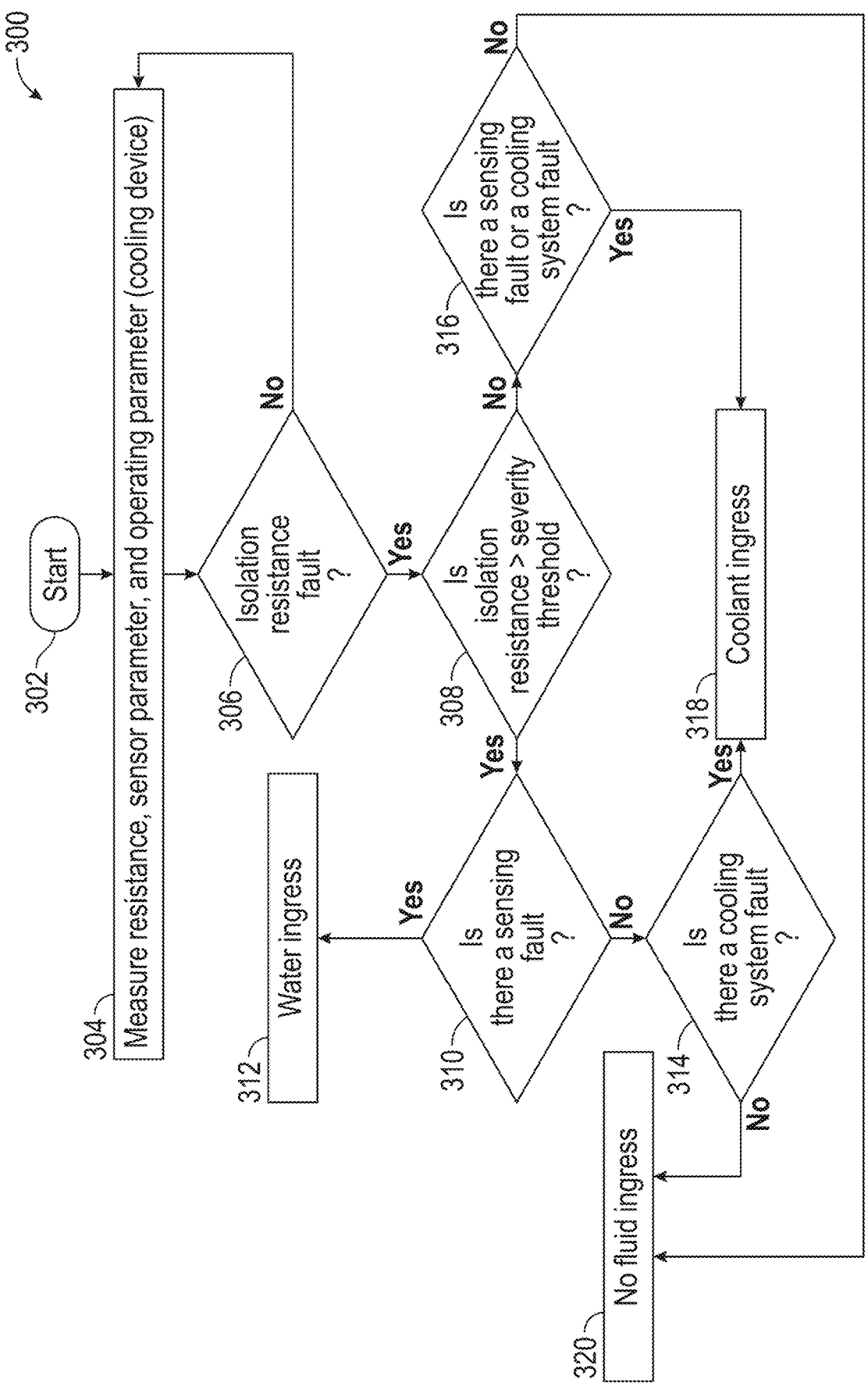
FIG. 3 shows a flowchart of a method for determining or detecting an occurrence of an ingress of moisture into the battery pack.

FIG. 3 shows a flowchart 300 of a method for determining or detecting an occurrence of an ingress of moisture into the battery pack. The moisture can be a fluid, such as water (e.g., due to ingress from outside the battery) or a coolant (e.g., due to a leak in the cooling system). The method includes measuring various parameters of the battery pack, cooling system and/or sensors and determining the presence of fluid based on an effect the fluid has on these parameters. Once moisture or fluid is detected, an action can be taken to mitigate the effects of the moisture in the battery pack.

The method starts at box 302. In box 304, parameters are measured, including battery pack parameters, sensor parameters and cooling system parameters. In box 306, an isolation resistance is determined from the battery pack parameters. An isolation fault occurs if the isolation resistance drops below an electrical fault threshold. If no isolation fault occurs, the method returns to box 304. If an isolation fault is detected, the method proceeds to box 308. In box 308, the isolation resistance is compared to a fault severity threshold. A major isolation fault will correspond to a low isolation resistance (i.e., less than the fault severity threshold) and a minor isolation fault will correspond to a high isolation resistance (i.e., greater than the fault severity threshold). If the isolation resistance is greater than the severity threshold, the method proceeds to box 310. Otherwise, the method proceeds to box 316.

Turning first to box 310, the sensing parameters are observed to determine if a sensing fault has occurred. If a sensing fault is detected, the method proceeds to box 312. In box 312, the determination is made that an ingress of water has occurred based on occurrence of both a minor isolation fault and a sensing fault. A suitable mitigation operation is implemented.

Returning to box 310, if no sensing fault is detected, the method proceeds to box 314. In box 314, cooling system parameters are observed to determine if there is a fault at the cooling system. If a fault has occurred at the cooling system, the method proceeds to box 318. In box 318, a determination is made that an ingress of coolant has occurred based on occurrence of both a minor isolation fault and a cooling system fault. An appropriate mitigation operation is performed. Returning to box 314, if no cooling system fault is determined, the method proceeds to box 320. In box 320, the method determines that an electrical fault has occurred, and that no fluid ingress has occurred.

Turning now to box 316, measurements are reviewed to determine if either a sensing fault or a cooling system fault has occurred. If either of these faults has occurred, the method proceeds to box 318, at which it is determined that coolant has entered the battery pack. An appropriate mitigation operation is performed. Otherwise, the method proceeds to box 320, in which it is determined that no fluid ingress has occurred.

In various embodiments, the mitigation operation can include disabling one or more cells of the battery pack, reducing a power limit of the battery pack. Preventing the closure of one or more contacts in the battery pack, discharging the battery pack to a lower value (or to fully discharged), preventing turning on of the vehicle, etc. The type of mitigation operation selected can be dependent on the severity of the water ingress. For example, a fluid ingress leading to a major isolation fault may necessitate preventing the vehicle from being turned on, while a fluid ingress leading to a minor isolation fault may be addressed by reducing the power limit of the battery pack.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
   measuring a battery pack parameter of a battery pack of the vehicle for an occurrence of a battery pack fault;
   measuring a sensor parameter for the occurrence of a sensor fault in a sensor associated with the battery pack;
   measuring a cooling system parameter of a cooling system associated with to the battery pack for the occurrence of a cooling system fault;
   determining an ingress of a fluid into the battery pack based on the occurrence of the battery pack fault and one of the sensor fault and the cooling system fault;
   determining the fluid to be a water based on the battery pack fault including a high isolation resistance and the occurrence of the sensor fault; and
   disabling one or more cells of the battery pack based on the ingress of the fluid into the battery pack.

2. The method of claim 1, wherein the battery pack fault includes a drop in an isolation resistance in a path between the battery pack and a ground potential below an electrical fault threshold.

3. The method of claim 1, wherein the sensor fault is related to at least one of: (i) operation of the sensor; (ii) operation of a communication device of the battery pack; and (iii) operation of a microprocessor of the battery pack.

4. The method of claim 1, further comprising determining the battery pack fault to be one of a low isolation resistance and the high isolation resistance based on a comparison of the isolation resistance to a severity threshold.

5. The method of claim 4, wherein the battery pack fault includes the low isolation resistance, the method further comprising determining the fluid to be a coolant based on either the occurrence of the sensor fault or the occurrence of the coolant sensor fault.

6. The method of claim 4, wherein the battery pack fault includes the high isolation resistance, the method further comprising determining the fluid to be a coolant based on the occurrence of the cooling system fault occurs and no occurrence of the sensor fault.

7. A system for operating a vehicle, comprising:
a battery pack;
a sensor associated with the battery pack;
a cooling system for cooling the battery pack;
a processor configured to:
measure a battery pack parameter of the battery pack for an occurrence of a battery pack fault;
measure a sensor parameter for the occurrence of a sensor fault in the sensor;
measure a cooling system parameter of the cooling system for the occurrence of a cooling system fault;
determine an ingress of a fluid into the battery pack based on the occurrence of the battery pack fault and one of the sensor fault and the cooling system fault;
determine the fluid to be a water based on the battery pack fault including a high isolation resistance and the occurrence of the sensor fault; and
disabling one or more cells of the battery pack based on the ingress of the fluid into the battery pack.

8. The system of claim 7, wherein the battery pack fault includes a drop in an isolation resistance in a path between the battery pack and a ground potential below an electrical fault threshold.

9. The system of claim 7, wherein the sensor fault is related to at least one of: (i) operation of the sensor; (ii) operation of a communication device of the battery pack; and (iii) operation of a microprocessor of the battery pack.

10. The system of claim 7, wherein the processor is further configured to determine the battery pack fault to be one of a low isolation resistance and a high isolation resistance based on a comparison of the isolation resistance to a severity threshold.

11. The system of claim 10, wherein the processor is further configured to determine the fluid to be a coolant based on the battery pack fault including the low isolation resistance and either the occurrence of the sensor fault or the occurrence of the coolant sensor fault.

12. The system of claim 10, wherein the battery pack fault includes the high isolation resistance, and the processor is further configured to determine the fluid to be coolant based on the battery pack fault including the high isolation resistance, the occurrence of the cooling system fault, and no occurrence of the sensor fault.

13. A vehicle, comprising:
a battery pack;
a sensor associated with the battery pack;
a cooling system for cooling the battery pack;
a processor configured to:
measure a battery pack parameter of the battery pack for an occurrence of a battery pack fault;
measure a sensor parameter for the occurrence of a sensor fault in the sensor;
measure a cooling system parameter of the cooling system for the occurrence of a cooling system fault;
determine an ingress of a fluid into the battery pack based on the occurrence of the battery pack fault and one of the sensor fault and the cooling system fault;
determine the fluid to be a water based on the battery pack fault including a high isolation resistance and the occurrence of the sensor fault; and
disabling one or more cells of the battery pack based on the ingress of the fluid into the battery pack.

14. The vehicle of claim 13 wherein the battery pack fault includes a drop in an isolation resistance in a path between the battery pack and a ground potential below an electrical fault threshold.

15. The vehicle of claim 13 wherein the sensor fault is related to at least one of: (i) operation of the sensor; (ii) operation of a communication device of the battery pack; and (iii) operation of a microprocessor of the battery pack.

16. The vehicle of claim 13, wherein the processor is further configured to determine the battery pack fault to be one of a low isolation resistance and a high isolation resistance based on a comparison of the isolation resistance to a severity threshold.

17. The vehicle of claim 16, wherein the processor is further configured to determine the fluid to be a coolant based on the battery pack fault including the low isolation resistance and either the occurrence of the sensor fault or the occurrence of the coolant sensor fault.

18. The vehicle of claim 16, wherein the processor is further configured to determine the fluid to be a coolant based on the battery pack fault including the high isolation resistance, the occurrence of the cooling system fault, and no occurrence of the sensor fault.

19. The method of claim 1, wherein the cooling system parameter is at least one of a low pump speed and an elevated coolant temperature.

20. The system of claim 7, wherein the cooling system parameter is at least one of a low pump speed and an elevated coolant temperature.

* * * * *